(12) United States Patent
Betley et al.

(10) Patent No.: US 11,454,334 B1
(45) Date of Patent: Sep. 27, 2022

(54) ACCURACY OF CONTROL VALVES USING A SHORT-STROKE POSITION CONVERTER

(71) Applicant: Dresser, LLC, Houston, TX (US)

(72) Inventors: Justin Walter Betley, Raynham, MA (US); John Gregory Canning, Kingston, MA (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/226,859

(22) Filed: Apr. 9, 2021

(51) Int. Cl.
 *F16K 37/00* (2006.01)
 *F16K 31/528* (2006.01)
 *F16K 1/22* (2006.01)
 *F16K 31/12* (2006.01)

(52) U.S. Cl.
 CPC .......... *F16K 37/0041* (2013.01); *F16K 1/221* (2013.01); *F16K 31/12* (2013.01); *F16K 31/5282* (2013.01); *Y10T 137/8242* (2015.04)

(58) Field of Classification Search
 CPC .. F16K 37/0041; F16K 1/221; F16K 31/5282; F16K 31/12; Y10T 137/8242
 USPC ....................................................... 137/554
 See application file for complete search history.

(56) References Cited

U.S. PATENT DOCUMENTS

| | | | | |
|---|---|---|---|---|
| 3,522,596 A * | 8/1970 | Fowler | G01D 5/2515 | 137/554 |
| 3,545,486 A * | 12/1970 | Larson | F16K 1/221 | 137/554 |
| 4,093,000 A * | 6/1978 | Poff | F16K 37/0033 | 137/554 |
| 4,825,904 A * | 5/1989 | Grau | F16K 31/0682 | 137/554 |
| 5,856,743 A * | 1/1999 | Juniman | G01B 7/003 | 324/207.25 |
| 6,655,652 B2 * | 12/2003 | Meinhof | F16K 37/0041 | 251/65 |
| 7,044,444 B2 * | 5/2006 | Haubold | F15B 15/10 | 137/554 |
| 7,609,056 B2 * | 10/2009 | Junk | F16K 37/0033 | 137/553 |
| 8,230,879 B2 * | 7/2012 | Kleegrewe | G05G 23/02 | 137/554 |
| 9,068,665 B2 * | 6/2015 | Kiesbauer | F16K 37/0075 | |
| 10,066,761 B1 * | 9/2018 | Hernu | F16K 37/0033 | |
| 2011/0048556 A1 * | 3/2011 | Carter | F16K 31/122 | 137/559 |
| 2014/0008561 A1 * | 1/2014 | Enke | F24F 13/1413 | 251/306 |

OTHER PUBLICATIONS

Baker Hughes, Masoneliean 49000 Series energy Management Control Valve Instruction Manual (Rev. D), 2020.

* cited by examiner

*Primary Examiner* — John Bastianelli
(74) *Attorney, Agent, or Firm* — Paul Frank + Collins P.C.

(57) ABSTRACT

A position transfer device is configured for use on a control valve. These configurations may convert a linear position of a closure member on the control valve to an angular position of magnets. A sensor in proximity to the magnets can generate a signal in response to the angular position. A valve positioner or controller can process the signal to identify the position of the closure member relative to a seat. In one implementation, the position transfer device includes a shaft that clamps onto a pin. This arrangement causes the pin to translate radially about an axis that is perpendicular to the shaft. The magnets move in response to the pin.

17 Claims, 8 Drawing Sheets

ACCURACY OF CONTROL VALVES USING A SHORT-STROKE POSITION CONVERTER

BACKGROUND

Flow controls operate in myriad applications. Control valves are a type of flow control that find use in industrial facilities, including as part of process lines. Designs for these devices are meant to accurately regulate flow to meet process parameters. It follows that accuracy issues with control valves may disrupt processes in a way that lower yields or reduces quality. In large, industrial operations, these problems may lead to significant expense due to downtime necessary to troubleshoot and repair or replace the problematic device(s).

SUMMARY

The subject matter of this disclosure relates to improvements to address accuracy issues in control valves. Of particular interest are embodiments of a device or mechanism that can convert a linear position to an angular position. Devices of the proposed designs may include a linearly translating shaft that couples with a rotatable mechanism. In one implementation, this mechanism can register an angular position that correlates directly to the linear position of the shaft. This feature is beneficial because it provides a measure of component position in control valves that is more reliable and more accurate than conventional linkage mechanisms because the proposed designs are much less complex and not susceptible to vibration or other influence that can affect measurements.

Measurement accuracy is important to various operations on the control valve. For example, the position measurement is critical to maintain a closure member in precise position relative to a seat. This position regulates flow to achieve appropriate process parameters. Control valves may also use the position measurement to engage certain operating "modes" on the device. Its "fully-opened" mode will ensure that the closure member reaches it farthest position from the seat. The "tight shut-off" mode may locate the closure member in its closed position (in contact with the seat) in response to commanded positions below a "lower" limit. For example, if the lower limit is 10%, the closure member contacts the seat at commanded positions below 10% and operate as normal for commanded positions above 10%. The tight shut-off mode is useful to prevent operating conditions that arise with the closure member in close proximity to the seat. These operating conditions cause the working fluid to flow at high flow rates or velocity that can cause wear and damage that can degrade performance and life span of the valve assembly.

DRAWINGS

Reference is now made briefly to the accompanying drawings, in which.

Figure 1:
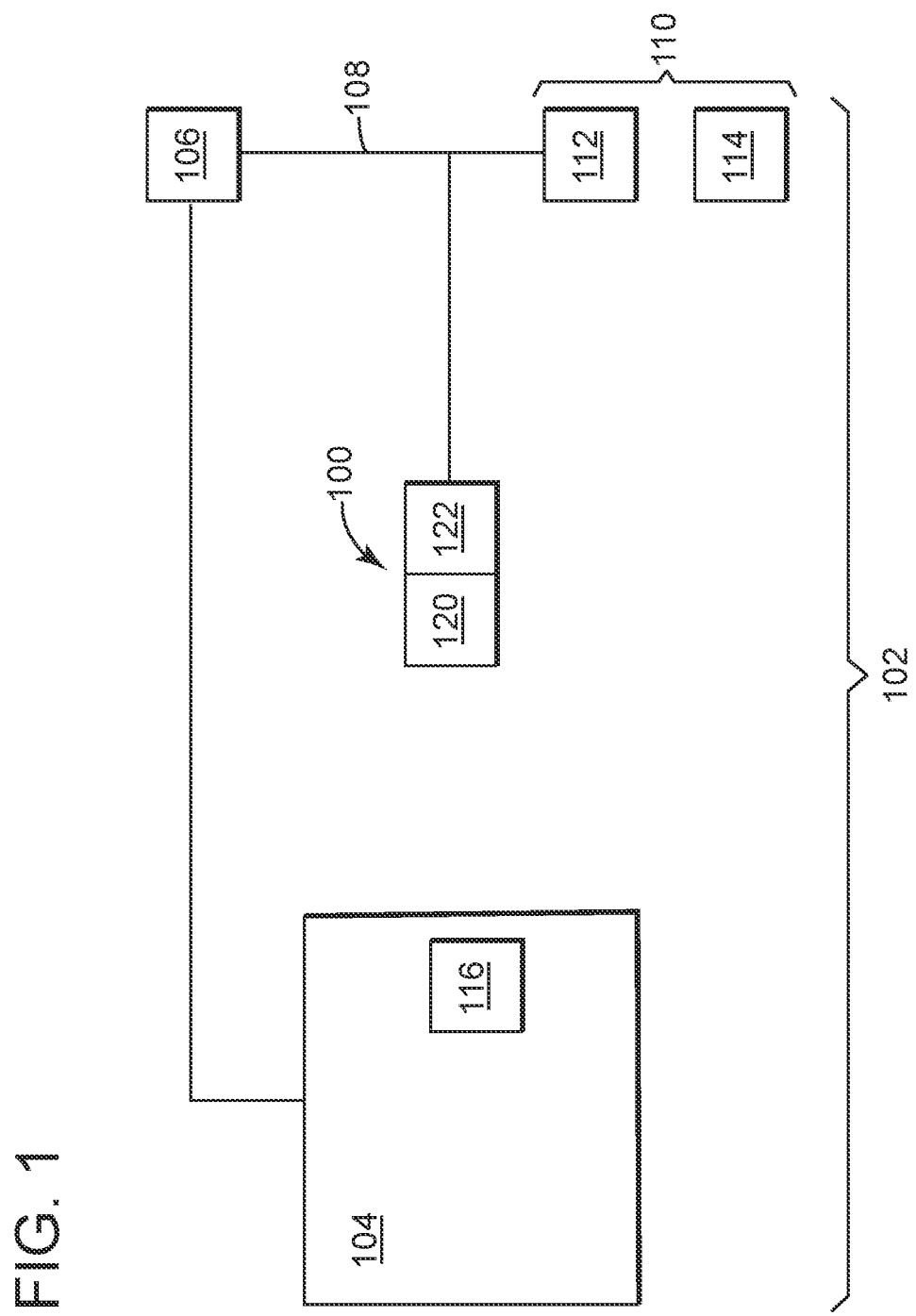
FIG. 1 depicts a schematic diagram of a position transfer device for use on a control valve.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. These embodiments foreclose the need for mechanical linkages to measure component position on control valves. These linkages are often large and bulky. They also tend to extend well outside of the structural envelope of the control valve. On the other hand, the designs herein fit entirely within this structural envelope. Other embodiments may be within the scope of this disclosure.

FIG. 1 depicts a schematic diagram of an exemplary embodiment of a position transfer device 100. This example is part of a valve assembly 102 that includes a valve positioner 104 (or "controller 104") that couples with an actuator 106. A valve stem 108 may connect the actuator 106 with a valve 110. This feature allows the actuator 106 to regulate movement of a closure member 112 relative to a seat 114. The controller 104 may also include a position sensor 116. As shown, the position transfer device 100 may include a sensor target unit 120 in proximity to the position sensor 116. The sensor target unit 120 may communicate with a transfer unit 122 that couples with the valve stem 108.

Broadly, the position transfer device 100 may be configured to convert a linear position to an angular position. These configurations may employ components that can connect to a linear drive or linear load, which are typical of many flow controls (including control valves). The components of the device 100 may fit into a small, compact form factor. This feature may provide a mechanism that is more robust because it is less susceptible to outside influences like vibration that can frustrate use of conventional linkages systems on control valves. As an added benefit, the proposed mechanisms may integrate with one another in a way that reduces or eliminates "backlash" or "play" in the measurement system. This feature can provide measured values that are more accurate than any conventional linkage in the field.

The valve assembly 102 may be configured for use in systems that transport materials. These configurations may connect in-line with conduit, like pipes and pipelines, as part of a process line or lines that transfer fluids. Hydrocarbon operations are known to leverage these devices to regulate flow of oil & natural gas (including liquefied natural gas or "LNG") from points of extraction to process facilities or within the process facilities themselves.

The controller 104 may be configured to exchange and process signals. These configurations may connect to a control network (or "distributed control system" or "DCS"), which maintains operation of all devices on the process lines to ensure that materials flow in accordance with a process. The DCS may generate control signals with operating parameters that describe or define operation of the valve assembly 102 for this purpose. For example, the operating parameters may define a commanded position for the valve assembly 102.

The actuator 106 may be configured to generate a load that works against pressure of material. These configurations may employ pneumatic devices, although electrical or electronic devices (e.g., motors) may work as well. Pneumatic devices may have a diaphragm internal to a housing. In operation, the controller 104 may deliver gas, or "instrument air," as a pneumatic signal. This instrument air signal changes pressure or load against the diaphragm inside of the housing of the actuator 106. The stem 108 directs the load to the valve 110. Parameters for the pneumatic signal depend in large part on the commanded position for the valve assembly 102.

The valve 110 may be configured to fix parameters of flow into the process line. These configurations often include hardware that couples with the pipes or pipeline. Manufacture of this hardware often comports with properties of the materials, including its composition or "phase," for example, solid, fluid, or solid-fluid mix. The closure member 112 may embody a plug, ball, butterfly valve, or like implement that can contact with the seat 114 to prevent flow. Location of the closure member 110 relative to the seat 112 permits more or less flow of material to pass through the valve 106 to satisfy the process parameters.

The position sensor 116 may be configured to generate data. These configurations may use non-contact modalities (e.g., magnetics) to generate values for a measured position of the closure member 110. In operation, the controller 104 may process signals from both the DCS and the positioner sensor 116 to set the pneumatic signal that operates the actuator 106 to maintain the closure member 112 at the commanded position. This features ensures flow of material through valve 106 to meet process parameters. The use of non-contact modalities allows the controller 104 to easily separate from (and install onto) the valve assembly 102. This feature simplifies maintenance and, in some applications, allows technicians to remove and replace the controller 104 as part of tasks to repair, upgrade, or maintain the device.

The sensor target unit 120 may be configured to convey an angular position. These configurations may embody devices that interface with the non-contact modality of the sensor 116. These devices may include magnets, particularly if the sensor 116 is of a type that is responsive to magnetic fields, like a hall-effect sensor. However, other devices may prevail that corresponds with the type of the sensor 116. These other types may employ optical or ultrasonic technologies, for example.

The transfer unit 122 may be configured to set this angular position. These configurations may embody devices that move in concert with the linear drive of the valve assembly 102. These devices may include linearly translating shafts; although rotatable mechanics may prevail as well. In one implementation, the translating shaft can set the angular position of the sensor target unit 120 to correspond with the position of the linear drive and, ultimately, the closure member 112.

Figure 2:
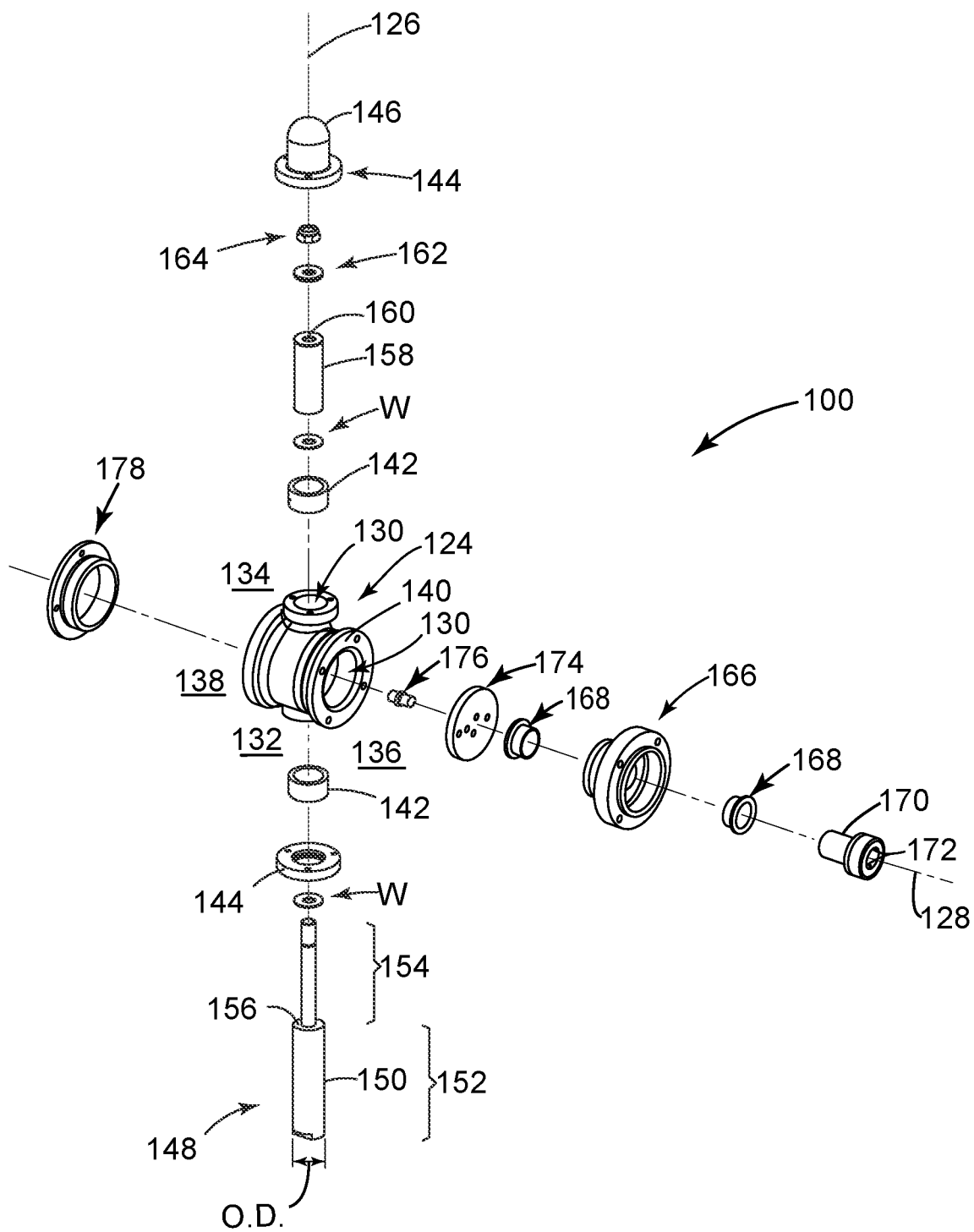
FIG. 2 depicts a perspective view of exemplary structure for the position transfer device in exploded form.

FIG. 2 depicts a perspective view of an example of structure for the position transfer device 100 of FIG. 1 in exploded form. This structure may include a main body 124 with an internal bore structure that creates perpendicular axes 126, 128. The bore structure may terminate at openings 130 on the main body 124, shown here on opposing sides 132, 134 and opposing sides 136, 138, respectively. Flanges 140 may circumscribe each of the openings 130. In one example, the structure may include bushings 142 that insert into the openings 130 on the sides 132, 134. Seals 144 may secure to the flanges 140 on the sides 132, 134 as well. Examples of the seals 144 may prevent dirt and debris from the interior of the device. This feature makes the proposed structure more amenable to harsh, corrosive environments and low-temperature applications. In one implementation, one of the seals 144 may incorporate a cap 146. Both the bushings 142 and the seals 144 may have bores to accommodate a drive shaft 148. In one implementation, the drive shaft 148 may include a driven part 150, shown here as an elongate, cylindrical member that can insert into the main body 124 from the side 132. This cylindrical member may have two sections 152, 154 of different outer diameter OD. The sections 152,154 may abut one another at a shoulder 156. A sleeve 158 may insert into the main body 124 through the side 134. The sleeve 158 may have a through-bore 160 that can receive the second section 154 of the driven part 150. A biasing unit 162 may insert onto an exposed end of the second section 154. The biasing unit 162 may include one or more springs, for example, Belleville washers or like constant force springs. In one implementation, a nut 164 may thread onto the exposed end.

The structure may be configured with components to create an angular position that reflects a linear position of the shaft 148. These configurations may include a rotary housing 166 that couples with the flange 140 on the side 136 of the main body 124. Bushings 168 may reside in bores of the rotary housing 166. The bushings 168 may have a through-bore that can receive a first portion of a sensor interface 170. Magnets 172 may reside in a second portion of the sensor interface 170. The magnets 172 may be arranged diametrically opposite to one another. Often, the second portion of the sensor interface 170 has a larger outer diameter than the first portion. A disc 174 may affix to an exposed end of the first portion of the sensor interface 170. The disc 174 may include a boss or pin 176 that extends along the axis 128 towards the drive shaft 148. In one example, a cover 178 may secure to the flange 140 on the side 138 to close the bore structure of the main body 124.

Figure 3:
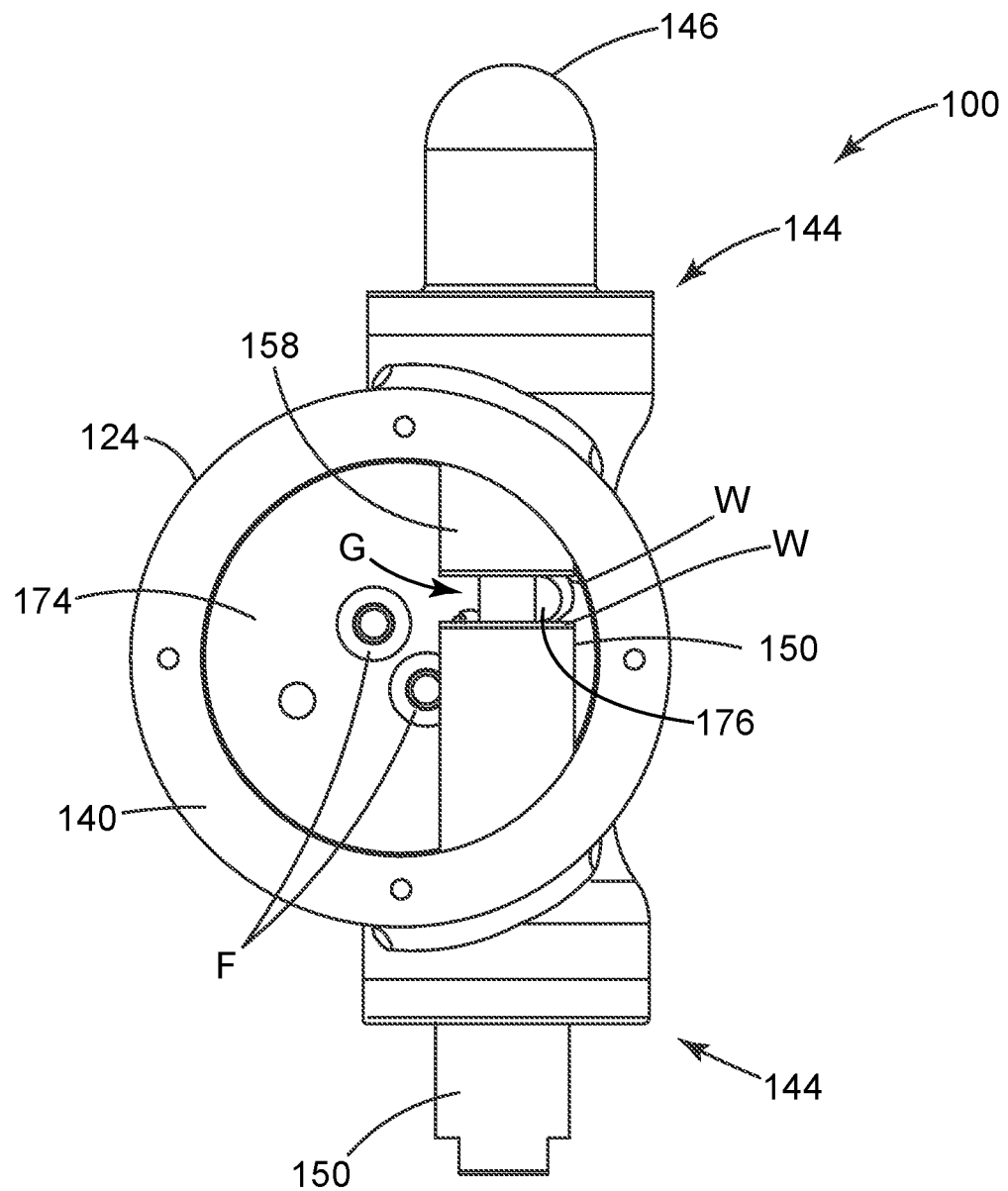
FIG. 3 depicts an elevation view from the back of the exemplary structure of FIG. 2 in assembled form.
Figure 4:
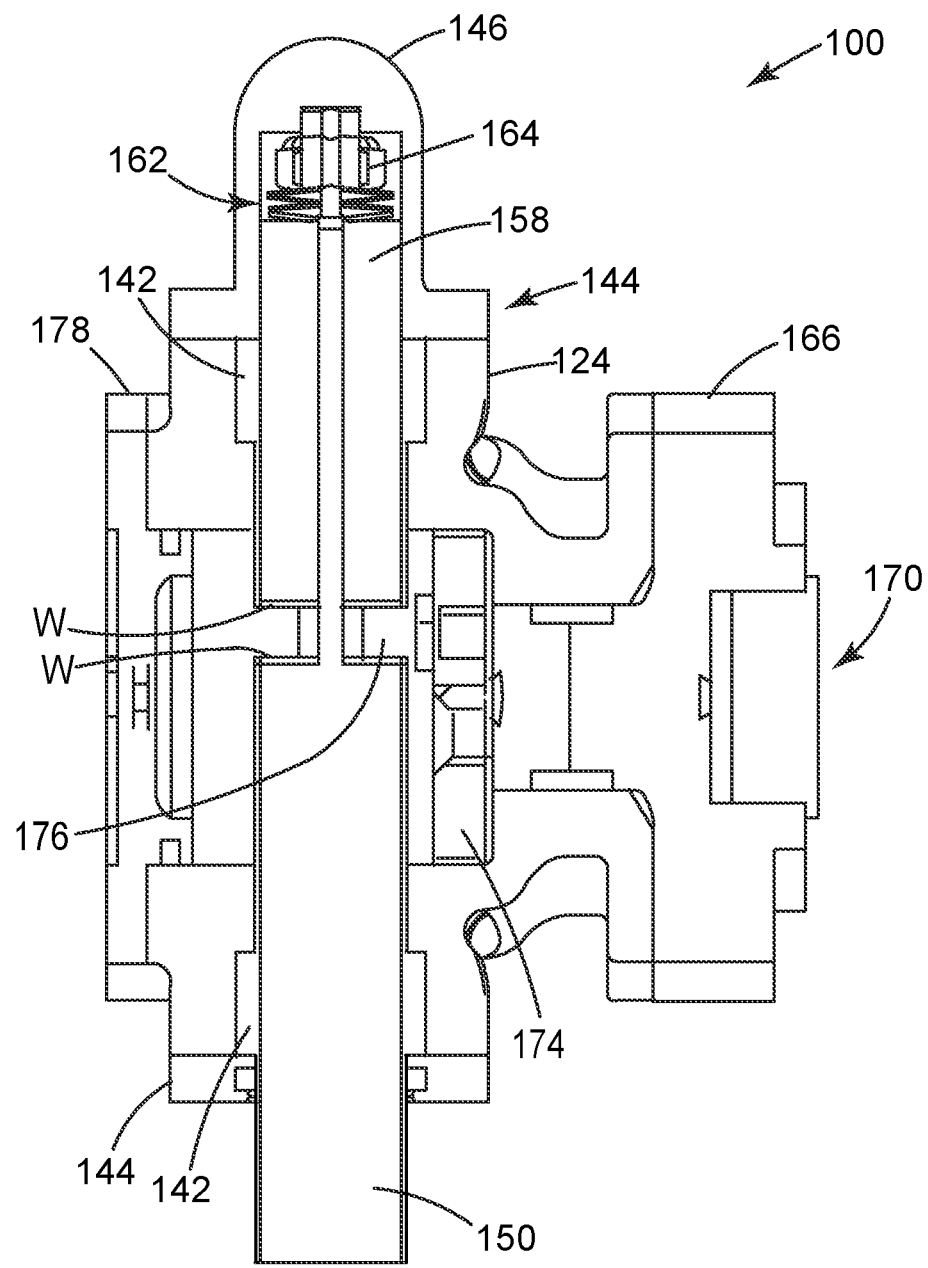
FIG. 4 depicts an elevation view of the cross-section of the exemplary structure of FIG. 2 in assembled form.

FIGS. 3 and 4 depict additional views of the position transfer device of FIG. 2. FIG. 3 shows an elevation view from the back in partially-assembled form. The cover 178 is removed to expose the interior of the main body 124. As shown, fasteners F may penetrate the disc 174 into the sensor interface 170 (FIG. 2). The shoulder 156 (FIG. 2) of the driven part 150 and an end of the sleeve 158 may form an intervening gap G in the drive shaft 148. Thrust washers W may bound the gap G. As best shown in the cross-section of FIG. 4, the pin 176 may extend into the intervening gap G and between the thrust washers W. Tightening the nut 164 compresses the springs 162 to create a pre-load on the pin 176. This pre-load clamps or "squeezes" the pin 176 in intervening gap G, thus coupling the rotatable disc 174 to the translating drive shaft 148.

Figure 5:
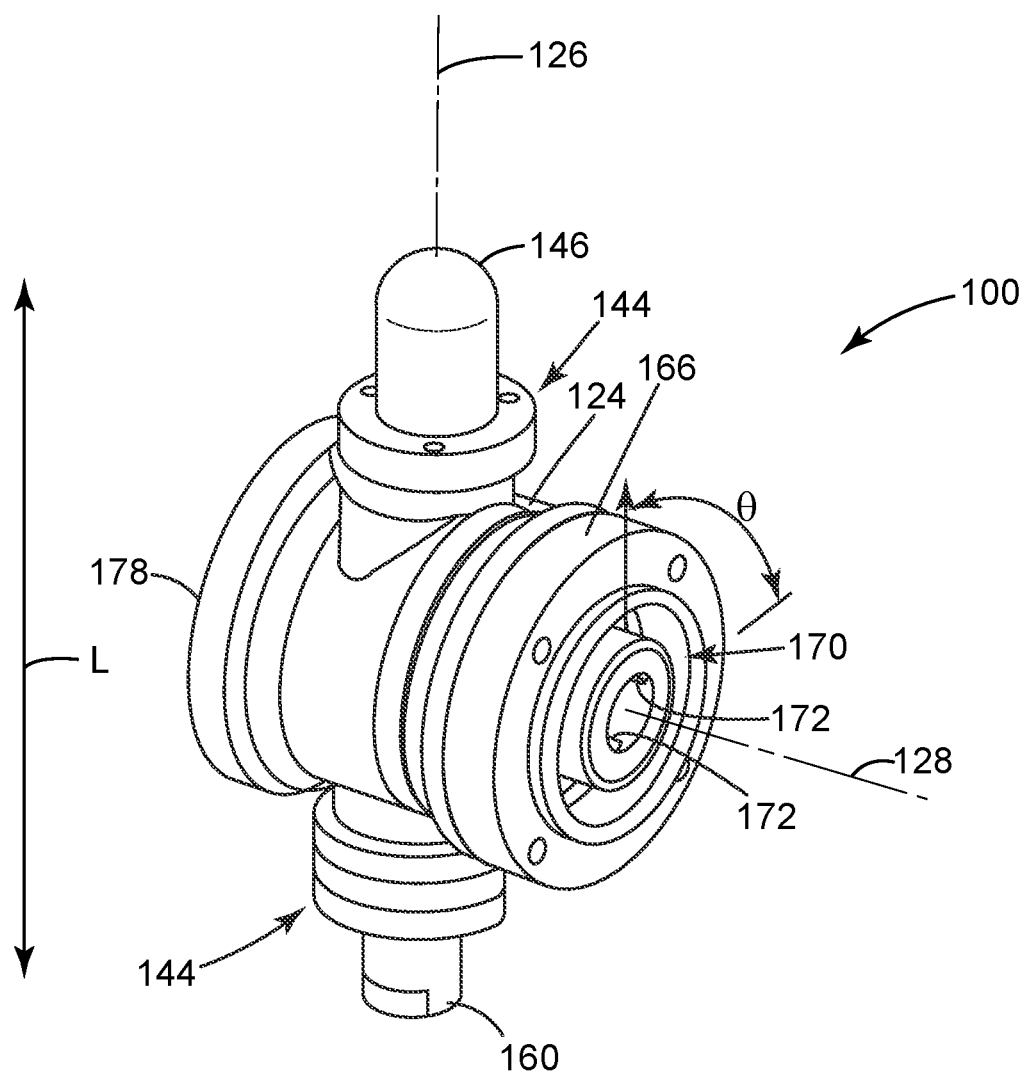
FIG. 5 depicts perspective view of the exemplary structure of FIG. 2 in assembled form.

FIG. 5 depicts a perspective view from the front of the position transfer device 100 of FIG. 2 in assembled form. Engagement between the drive shaft 148 and the rotatable disc 174 may set an angular position θ for the magnets 172 on sensor interface 170 about the axis 128. This angular position may correspond with a linear position L of the drive shaft 148 on the axis 126. Translation of the driven part 150 to different positions on the axis 126 (e.g., from a first position to a second position) will cause the disc 174 to rotate in the main housing 124, which in turn will result in a different angular position θ for the magnets 172.

Figure 6:
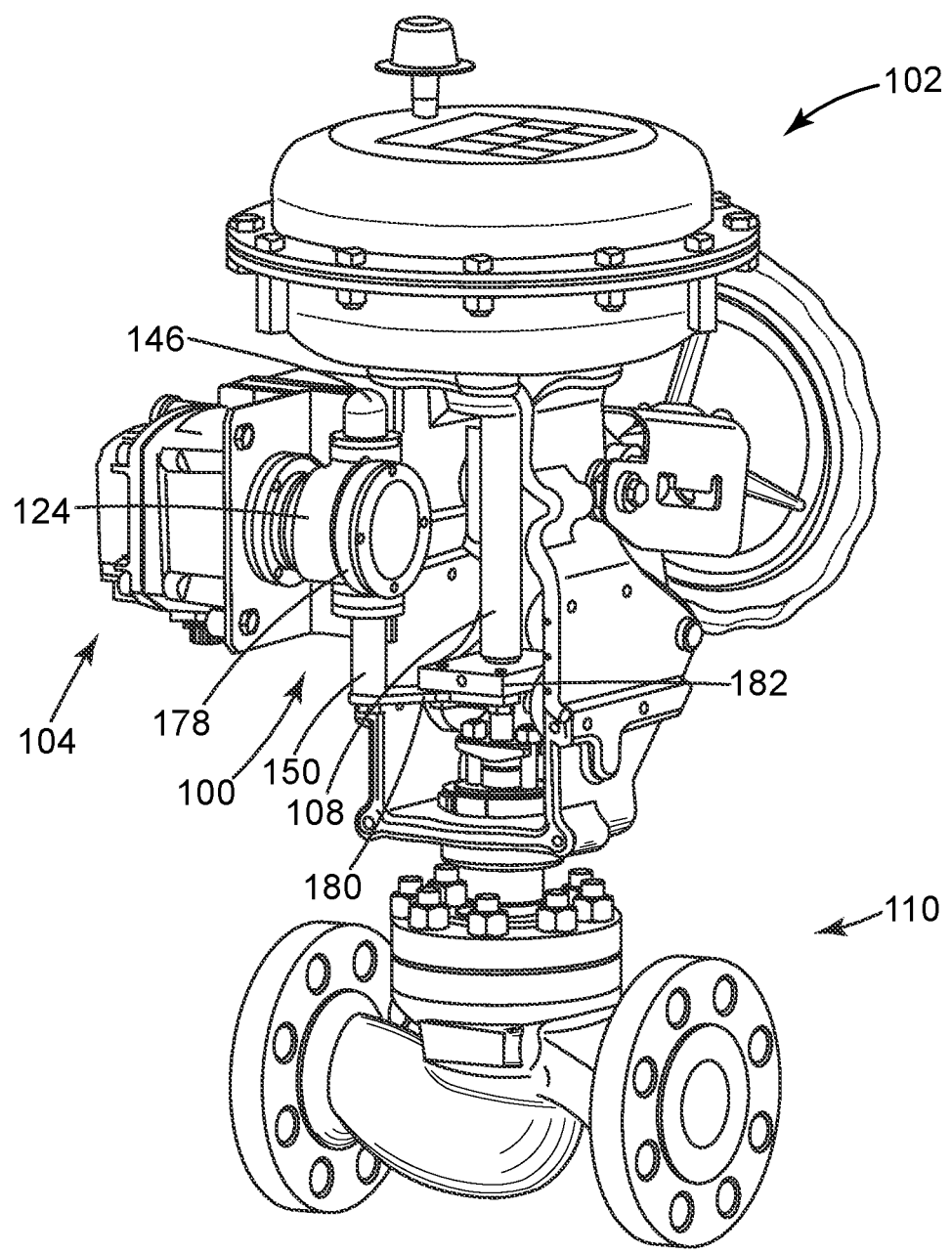
FIG. 6 depicts a perspective view of the exemplary structure of FIG. 3 in position on an example of a control valve.

FIG. 6 depicts a perspective view of the position transfer device 100 of FIG. 2 on an example of the valve assembly 102 of FIG. 1. The structure may mount with the magnets 164 (FIG. 2) in proximity to the sensor 116 (FIG. 1) on the controller 104. A tie bar 180 may couple one end of the driven part 150 to a transfer block 182 on the valve assembly 102. In this way, the position of the transfer block 186 transfers directly to the drive shaft 148 to set the angular position θ of the magnets 172 (FIG. 4).

Figure 7:
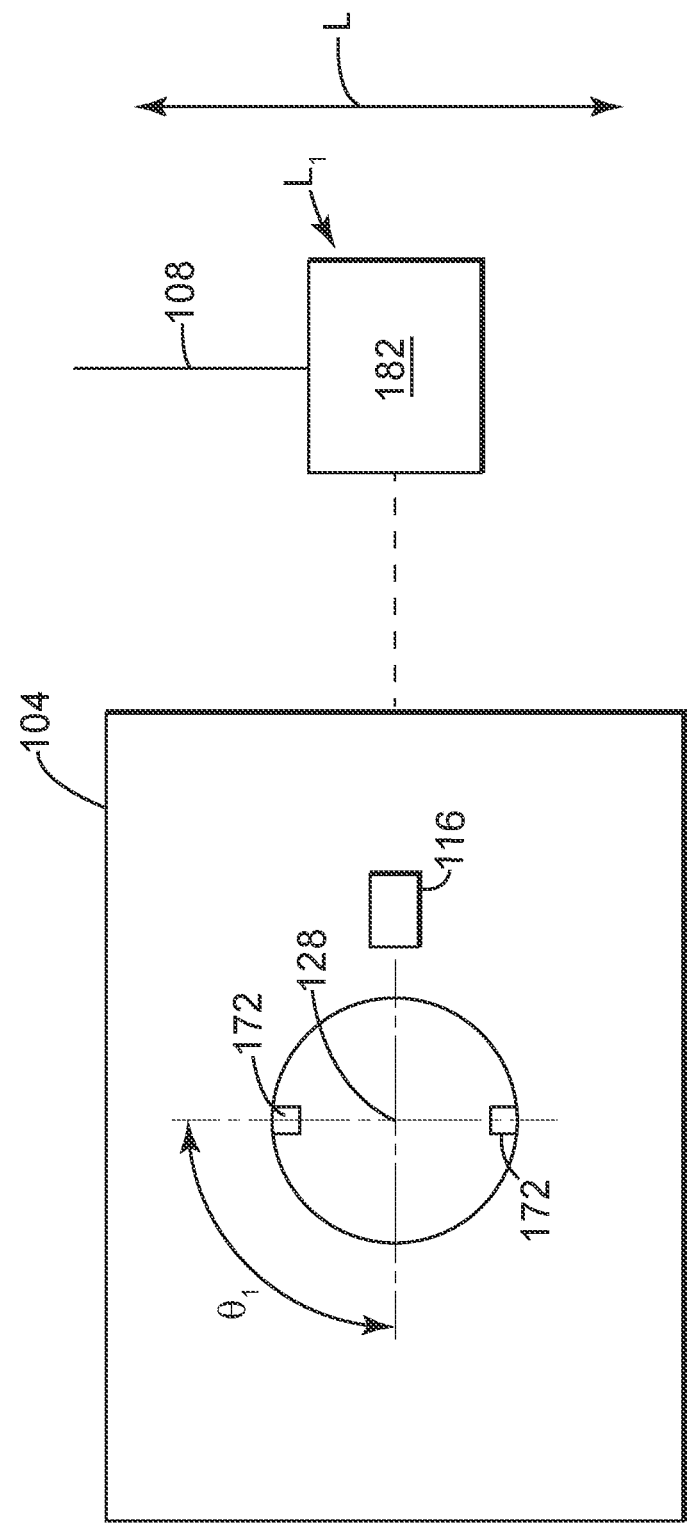
FIG. 7 depicts a schematic diagram of an example of the position transfer device of FIG. 1 with magnets in a first angular position.
Figure 8:
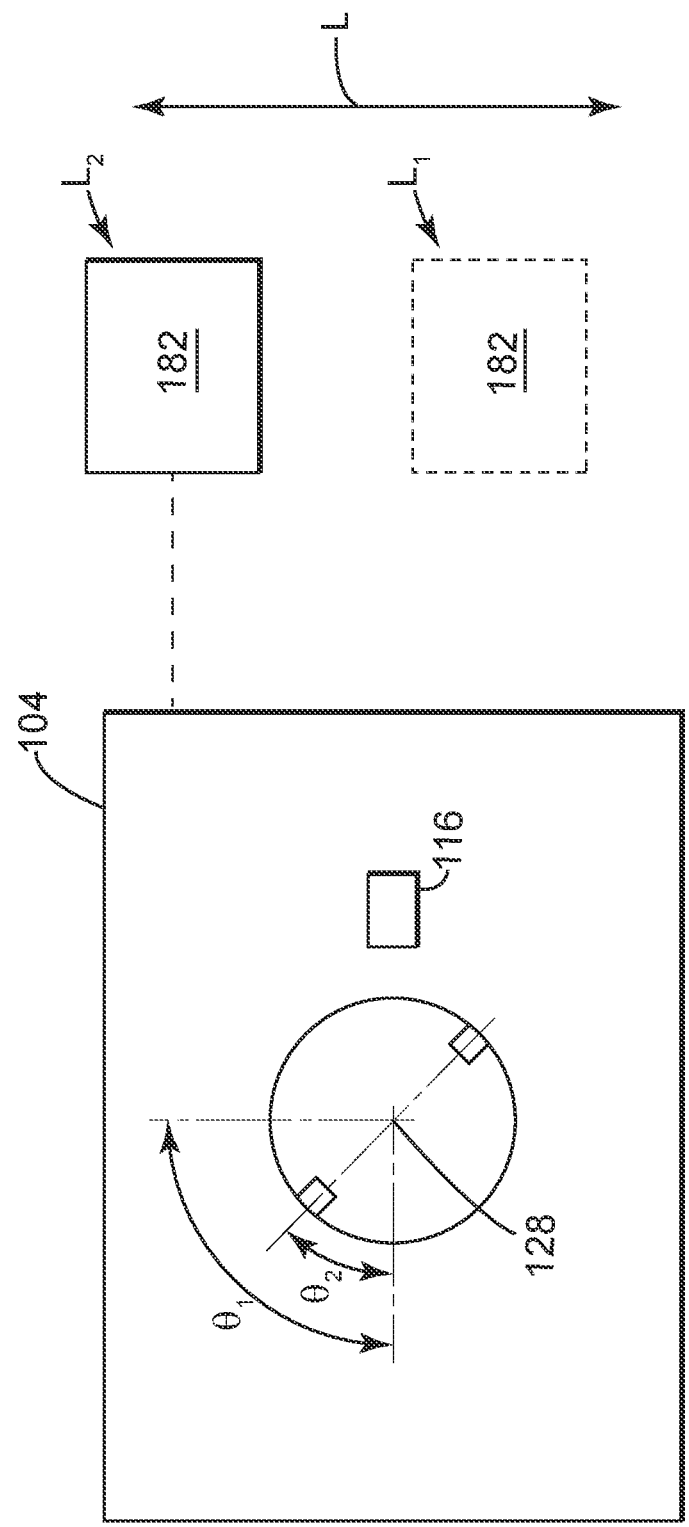
FIG. 8 depicts a schematic diagram of an example of the position transfer device of FIG. 1 with magnets in a second angular position.

FIGS. 7 and 8 depict a schematic diagram to illustrate operation of the device of FIG. 6. In FIG. 7, the magnets 172 have a first angular orientation $θ_1$ that corresponds with a first linear position $L_1$ of the drive shaft 148. The tie bar 180 ensures that the first linear position $L_1$ corresponds with the position of the transfer block 182, which itself moves in concert with the valve stem 108. FIG. 8 shows the magnets 172 at a second angular orientation $θ_2$ that corresponds with a second linear position $L_2$ of the drive shaft 148. This second linear position $L_2$ indicates the change in position of the transfer block 182, for example, where it moves upward in response to movement of the valve stem 108. This new position may indicate that the closure member (not shown) moves away from the seat (not shown) in the valve assembly 102.

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly, comprising:
   a pneumatic actuator;
   a valve stem coupled with the pneumatic actuator;
   a shaft coupled with the valve stem and configured to move concomitantly with the valve stem;
   a rotatable mechanism coupled with the shaft, the rotatable mechanism comprising a pin engaged with the shaft and magnets that have an angular position that corresponds with a linear position of the valve stem; and
   a sleeve with a through-hole to receive the shaft, wherein the pin extends in between the shaft and the sleeve.

2. The valve assembly of claim 1, wherein the shaft is configured to apply a pre-load on the pin.

3. The valve assembly of claim 1, further comprising:
   a biasing unit coupled with the shaft, wherein the biasing unit generates a pre-load that acts through the shaft onto the pin.

4. The valve assembly of claim 1, wherein the shaft translates along an axis that is perpendicular to the pin.

5. The valve assembly of claim 1, wherein the pin translates radially about an axis that is perpendicular to the shaft.

6. The valve assembly of claim 1, wherein the pin extends perpendicular to the shaft.

7. The valve assembly of claim 1, further comprising:
   a tie bar that couples the shaft to the valve stem.

8. A valve assembly, comprising:
   a pneumatic actuator;
   a valve stem coupled with the pneumatic actuator;
   a shaft coupled with the valve stem and configured to move concomitantly with the valve stem; and
   a rotatable mechanism coupled with the shaft, the rotatable mechanism comprising a pin engaged with the shaft and magnets that have an angular position that corresponds with a linear position of the valve stem;
   a sleeve with a through-hole to receive the shaft; and
   a biasing unit that generates a pre-load to clamp the pin between the shaft and the sleeve.

9. A valve assembly, comprising:
   a pneumatic actuator;
   a valve stem coupled with the pneumatic actuator;
   a shaft coupled with the valve stem and configured to move concomitantly with the valve stem; and
   a rotatable mechanism coupled with the shaft, the rotatable mechanism comprising a pin engaged with the shaft and magnets that have an angular position that corresponds with a linear position of the valve stem;
   a sleeve with a through-hole to receive the shaft;
   spring washers disposed on an end of the shaft; and
   a nut threaded onto the end of the shaft in position to compress the spring washers,
   wherein the pin extends between the shaft and the sleeve.

10. A valve assembly, comprising:
    a pneumatic actuator;
    a valve stem coupled with the pneumatic actuator;
    a shaft coupled with the valve stem and configured to move concomitantly with the valve stem; and
    a rotatable mechanism coupled with the shaft, the rotatable mechanism comprising a pin engaged with the shaft and magnets that have an angular position that corresponds with a linear position of the valve stem,
    wherein the shaft comprises a first part and a second part with a reduced diameter section that extends into the first part and forms a shoulder so as to receive the pin between the shoulder and an end of the first part.

11. The valve assembly of claim 10, further comprising:
    a biasing unit coupled with the shaft, the biasing unit apply a pre-load on the pin.

12. The valve assembly of claim 10, wherein the shaft has two parts that form a gap to receive the pin.

13. A control valve, comprising:
    a valve with a closure member, a seat, a valve stem, and an actuator;
    a measurement system configured to measure a position of the closure member, the measurement system comprising:
    a sensor;
    a shaft coupled with the closure member, the shaft having two, separate parts with adjacent ends, the shaft moveable along a first axis to a position that corresponds with a location for the closure member relative to the seat;

a pin extending perpendicular to the first axis and having a first end extending into a gap formed between the adjacent ends of the two, separate parts of the shaft; and a pair of magnets coupled with the pin and in proximity to the sensor, the pair of magnets rotatable about a second axis that is perpendicular to the first axis.

14. The control valve of claim 13, wherein the measurement system comprises:

a cylindrical body coupled with the pin and holding the magnets diametrically opposite to one another.

15. The control valve of claim 13, wherein the measurement system comprises:

a rotatable disc aligned on the second axis and receiving a second end of the pin.

16. The control valve of claim 13, wherein the measurement system comprises:

a spring load acting on the shaft to clamp the first end of the pin.

17. The control valve of claim 13, wherein the measurement system comprises:

a tie bar that couples the shaft to the valve stem.

* * * * *